A. C. HULL.
Broiler.

No. 100,410.  Patented Mar. 1, 1870.

Witnesses:  Inventor:
William W. Herthel  Abraham C. Hull
Robert Burns  by his attys
 Herthel & Co.

United States Patent Office.

ABRAHAM C. HULL, OF ST. LOUIS, MISSOURI, ASSIGNOR TO HIMSELF AND J. C. CAMERON, OF SAME PLACE.

Letters Patent No. 100,410, dated March 1, 1870.

BROILER.

The Schedule referred to in these Letters Patent and making part of the same.

*To all whom it may concern:*

Be it known that I, ABRAHAM C. HULL, of St. Louis, in the county of St. Louis, and State of Missouri, have invented a new and useful Improvement in Broilers; and I do hereby declare that the following is a full and true description thereof, reference being had to the accompanying drawings and to the letters of reference marked thereon.

This invention relates to such an arrangement and construction of the parts of a broiler or other similar frying and cooking vessel, that the juices of the meat or other articles of food to be prepared shall not be be wasted, and more especially that the said juices shall not drop to the fire, and by their partial combustion create nauseous smell and smoke, or soil the cooking and heating utensils.

For said purposes, this invention relates to a peculiar construction of the grating whereon the food is broiled, and to the arrangement of a receiver-trough in connection therewith, to take up and store the fat, oils, juices, and other more or less liquid components of meats and other food. Said trough is so arranged and placed as to prevent undue heat from charring (scorching) the said juices, so that these will be in proper palatable condition for use.

This invention relates also to certain details of construction which hereafter more fully appear, all of which, in connection with the features before referred to, act to give to my said broiler an improved and more highly useful form than possessed by many devices now in common use.

To enable those herein skilled to make and use my said device, I will now more fully describe the same, referring herein to the accompanying—

Figure 1:
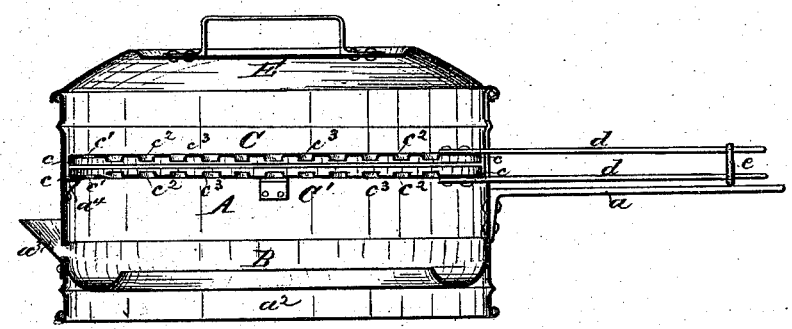

Figure 1 as a sectional elevation, and to

Figure 2:
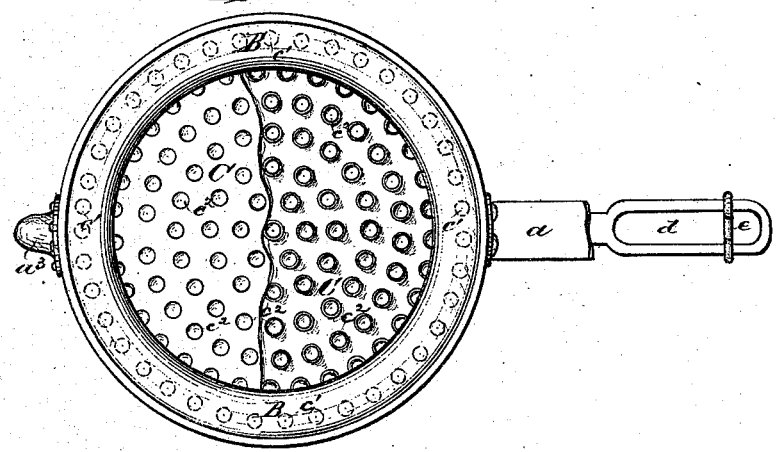

Figure 2 as a bottom plan.

Figure 3:
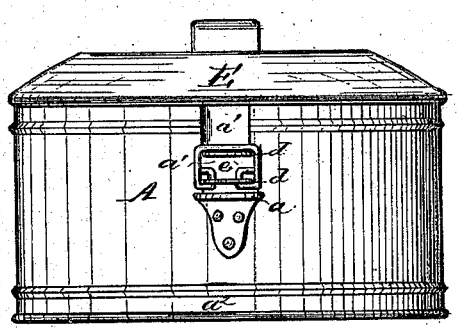

Figure 3 is a side view.

I use an exterior casing, A, formed of any material which readily adapts itself to the various forms required, (usually sheet metal.)

This has a proper handle, $a$, which is placed upon the casing side just below a slot, $a^1$, cut in said side.

The lower edge of the casing A is beaded, and usually, in the ordinary uses of the broiler, rests upon the stove or furnace.

Sufficiently above said edge, $a^2$, so that its lower edge or base shall not touch the metal of the stove or be too close thereto, I arrange the trough B. This is an annular receiver attached on the inner surface of the casing, and will act to receive and store the meat juices or other liquids.

In order to pour these fluids out, the lip $a^3$ is placed upon the casing in proper communication with the trough.

Upon the casing, inner side, I arrange two or more rests, $c^4$, or brackets, which act to sustain the gratings C C'.

These are usually metallic plates, having circumferential raised edges, $c$.

Close to said edges, and arranged on a circular or other line corresponding to the form of the gratings and casings, are the perforations or drop-holes $c^1$, and within the line of said drop-holes are the openings $c^2$, all of which are punched or otherwise formed so that their circumferences shall rise up ridge-like at $c^3$.

When, therefore, meats are placed between the said gratings, (or upon one thereof,) the juices will gather upon the grating at its inner part, and the ridges $c^3$ prevent the waste thereof, so that said juices pass to the outer part of the grating and drop, by the holes $c^1$, to the receiver B, to be therefrom discharged at convenience.

It is preferable to use two gratings, C and C', hinged to each other, and each having a handle, $d$.

The two handles may then be held together by a wire-hasp, $e$, or other ferrule device.

When the parts are in adjustment for use, the gratings C and C' rest upon the brackets $c^4$, and the handles $d$ pass through the casing A at the slot $a^1$, so as to lie upon or close to the handle $a$. Thus the operator may grasp the several handles $d$ and $a$ at once, and readily carry the entire device as may be needed.

Moreover, when it is desired to reverse the gratings by turning the upper one so as to bring it below, this operation may be readily accomplished without disturbing the casing A.

A suitable cover, E, is placed on the casing A, thus preventing escape of fumes. I prefer to make said cover of tin or similar bright metal, so as to receive the advantage of the heat-reflection thereby caused.

My said device will be conformed in outline to the furnace, stove, or other heater to which it is applied.

Having thus fully described my invention,

What I claim, is—

1. The casing A, its raised trough B, and lip $a^3$, when arranged substantially as and for the purpose set forth.

2. The combination of the casing A, handle $a$, and slot $a^1$, with the gratings C C' and handles $d$, substantially as set forth.

In testimony of said invention I have hereunto set my hand in the presence of—

ABRAHAM C. HULL.

Witnesses:
WILLIAM W. HERTHEL,
J. C. CAMERON.